United States Patent Office 3,394,185
Patented July 23, 1968

3,394,185
N,N'-BIS(t-ALKYLAMINO)DISULFIDES
David H. Clemens, Willow Grove, Pa., assignor to Rohm & Haas Company, Philadelphia, Pa., a corporation of Delaware
No Drawing. Filed Sept. 9, 1964, Ser. No. 395,297
7 Claims. (Cl. 260—583)

ABSTRACT OF THE DISCLOSURE

N,N'-bis(t-alkylamino)disulfides of the formula

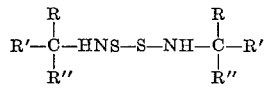

useful as fungicides, as corrosion inhibitors and as chemical intermediates.

---

This invention is concerned with novel bis(t-alkylamino)disulfides.

These novel compounds have the structure

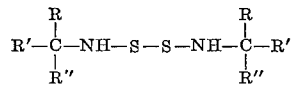

wherein R, R' and R" represent alkyl groups.

These compounds are prepared by the reaction of tertiary-alkylamines with sulfur monochloride, $S_2Cl_2$.

By this invention, there are made available new types of dialkylaminodisulfides which are easily prepared from readily available raw materials and which are notably stable by comparison with previously known related structures. They are useful as fungicides, as corrosion inhibitors and as chemical intermediates, particularly for the preparation of N,N'-di-t-alkylsulfurdiimines.

The reaction of a few primary amines with sulfur monochloride has been the subject of previous studies; however, in none of these was a study made of the kind of product obtained when t-alkylamines were the primary amines used. United States Patents Nos. 2,209,976, 2,259,164 and 2,417,954 mention products made from butylamine and cyclohexylamine, but such products are of uncertain structure and unstable. Becke-Goehring and Jenne in Ber., 92, 1149 (1953) under carefully controlled conditions were able to obtain crystalline cyclic-tetra-thiadiimides from reaction of sulfur monochloride with five somewhat diverse primary amines. In no instance was there isolated a bis(alkyl)disulfide of the type prepared in the present invention.

The reaction proper involves two moles of the t-alkylamine with one mole of sulfur monochloride, $S_2Cl_2$. However, since hydrogen chloride is split out, it is desirable to have an acid acceptor present. This is most effectively done by using an excess of the t-alkylamine, e.g.,

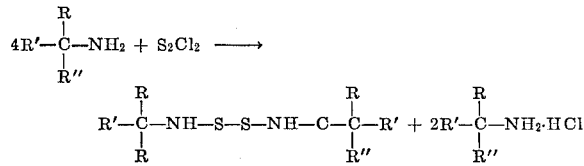

Excess of the t-alkylamine up to twice the number of moles shown in the above equations or more may be used. In some cases, however, other alkaline agents may be employed. Examples of this are tertiary amines, such as triethylamine or pyridine, alkali metal hydroxides, such as sodium or potassium hydroxides and inorganic carbonates, such as calcium carbonate. These acid acceptors may be in an anhydrous state or as aqueous solutions.

t-Alkylamines which may be used in these reactions include, for example, t-butylamine, t-octylamine, t-nonylamine, t-dodecylamine, t-tetradecylamine, t-octadecylamine, t-docosylamine, t-tetracosylamine and mixtures of two or more of such amines. These amines are commonly prepared by the so-called Ritter reaction involving the reaction of nitriles with alkenes or secondary or tertiary alcohols in strongly acidic media. Commercially available t-alkylamines are often mixtures. t-Octylamine has the structure:

$$(CH_3)_3CCH_2(CH_3)_2CNH_2$$

and the alkyl group of this amine will herein be referred to as t-octyl. One form of t-nonylamine is prepared as a mixture containing $$C_6H_{13}(CH_3)_2CNH_2$$

and $$C_7H_{15}(CH_3)_2CNH_2$$

and has a neutral equivalent of about 142. A commercial preparation known by the trademarked name of Primene 81–R is a mixture of t-dodecyl-, t-tridecyl- and t-tetradecylamines having a neutral equivalent of about 191. A commercial preparation known by the trademarked name of Primene JM–T is principally a mixture of t-$C_{18}H_{37}NH_2$ to t-$C_{22}H_{45}NH_2$ and has a neutral equivalent of about 315. The important consideration is that in a t-alkylamine, the $NH_2$ group is always attached to a carbon atom containing no hydrogen. Even though t-alkylamines of higher molecular weight than t-tetracosylamine may be prepared, for the purpose of this invention, those amines are preferred wherein the total number of carbon atoms in the

group is less than 25. It is preferred that two of the R groups in the

grouping of the t-alkylamine be methyl groups.

Typical of the new compounds of this invention are the following:

N,N'-di-t-butylaminodisulfide,
N,N'-di-t-octylaminodisulfide,
N,N'-di-t-nonylaminodisulfide,
N,N'-di-t-dodecylaminodisulfide,
N,N'-di-t-tetradecylaminodisulfide,
N,N'-di-t-octadecylaminodisulfide,
N,N'-di-t-eicosylaminodisulfide,
N,N'-di-t-docosylaminodisulfide, and
N,N'-di-t-tetracosylaminodisulfide.

Molecular weight determinations and analysis of the elements indicate that the products of this invention are the indicated disulfide structures. Other structures may possibly be visualized; however, it is the present opinion that the disulfide structure given above is the best representation.

The reactions may be run in the absence of a solvent or in the presence of a volatile, inert, organic solvent. An excess of the t-alkylamine utilized in a specific reaction may be used as the solvent. Common inert solvents which may be employed includes ethers, such as diethyl ether, dipropyl ether, dibutyl ether, ethyleneglycoldimethyl ether, diethyleneglycoldimethyl ether and the like; hydrocarbons, such as benzene, toluene, xylene, hexane, mineral spirits and the like; and chlorinated hydrocarbons, such as methylene dichloride, ethylene dichloride, perchloroethylene, chlorobenzene and the like. Mixtures of solvents may also be used.

Reaction temperatures which may be employed are in the range from −70° to about 100° C. The preferred temperature for the reaction is between 0° and 25° C. As a rule, the reactions are exothermic and cooling is often desirable to keep the temperature in this range. In certain cases, the bis (t-alkylamino)-disulfides of this invention may fragment when subjected to temperatures in excess of 65° C.; hence, the upper temperature for the reaction is that which will not cause this fragmentation to occur with the specific preparation involved.

The reactions are usually fast and are essentially complete in a matter of minutes. Longer reaction times up to 24 hours or more are not injurious and may be preferred at low reaction temperatures. The reactions are considered complete when the exotherm is over, and essentially the theoretical amount of chloride ion has been produced.

The products may be isolated from the reaction mixture as the technical grade products which are often oils. They are usable as such without further purification. They may, however, be further purified by ordinary means, if desired, taking into account possible limitations due to thermal instability.

The polymeric structures previously known in the literature made from reaction of primary alkylamines such as methylamine and ethylamine, with sulfur ethylamine, with sulfur monochloride decompose slowly at room temperature and explosively at higher temperatures to give tarry products. In contrast to these, the products of the present invention show no evidence of decomposition after standing for many months at room temperature and on heating at higher temperatures, they do not explode but decompose smoothly to give well-defined products.

The bis(t-alkylamino)disulfides undergo the valuable pyrolysis reaction to produce N,N'-di-t-alkyl sulfurdiimines, as illustrated by the following equation:

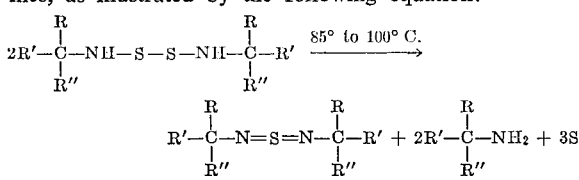

In turn, these N,N'-di-t-alkyl sulfurdiimines are valuable as chemical intermediates, since they undergo a variety of reactions and are useful as stabilizers for polypropylene.

The following examples are provided to further illustrate the invention. Parts given are by weight.

Example 1.—Preparation of N,N'-di-t-butylaminodisulfide

In a 3-liter 3-neck flask equipped with a condenser, stirrer, drying tube and dropping funnel is placed 910 parts of anhydrous ether and 344 parts (4.7 moles) of t-butylamine. The reaction mixture is cooled to 3° C. in an ice bath and a solution of 135 parts (1.0 mole) of sulfur monochloride in 280 parts of anhydrous ether is added dropwise over a 7 hour period with continued ice cooling. During this time, a copious white precipitate of t-butylamine hydrochloride is noted. After completion of the addition, the reaction is allowed to stir for 20 minutes and kept overnight. The t-butylamine hydrochloride is filtered off and washed with ether. The weight of the dried salt is 236 parts. The filtrate is transferred to a 3-liter flask and the ether evaporated off using a rotating evaporator. After the ether has been removed, evaporation is continued at a pressure of <0.5 mm. (Mg)

until constant weight is reached. There remains 158 parts of a light yellow oil. It contains by analysis 44.26% C, 9.01% H, 12.28% N and 34.11% S; calculated for $C_8H_{20}N_2S_2$ is 46.11% C, 9.67% H, 13.44% N and 30.77% S. The product is a 76% yield of somewhat crude di-t-butylaminodisulfide.

Example 2.—Preparation of N,N'-di-t-octylaminodisulfide

In a 1-liter 3-neck flask equipped with a condenser, stirrer, dropping funnel and drying tube is placed 450 parts of anhydrous ether and 132 parts (1 mole) of t-octylamine. The reaction mixture is cooled to 80° C. in an ice bath and a solution of 27 parts (0.2 mole) of sulfur monochloride in 140 parts of anhydrous ether is added dropwise over a 2.5 hour period with continued cooling. After the addition is complete, stirring is continued for 25 minutes and the reaction mixture allowed to stand overnight. The reaction mixture is filtered to remove t-octylamine hydrochloride and this salt is washed with ether. The ether is evaporated off on a rotating evaporator and evaporation continued at a pressure of 0.5 mm. (Hg) and a temperature of about 35° C. until all volatiles are removed. There remains 58 parts of oil. Forty-two parts of this oil slowly deposits a solid over a period of three weeks at which time 12 parts are isolated by filtration. Recrystallization from ether at −78° C. gave a solid melting at 43° to 45° C. The nuclear magnetic resonance spectrum had peaks at 9.00, 8.76, 8.49 and 6.98 $\tau$ with an approximate area ratio of 9 to 6 to 2 to 1. The solid contains by analysis 59.96% C, 11.21% H, 9.18% N and 20.09% S; calculated for $C_{16}H_{36}N_2S_2$ is 59.94% C, 11.32% H, 8.74% N and 20.0% S and a molecular weight of 320.6. A molecular weight determination by a vapor pressure lowering method gives a value of 321. This product is N,N'-di-t-octylaminodisulfide and the 58 parts of oil represents a 90% yield of this compound.

Example 3.—Preparation of a mixture of N,N'-di-t-dodecyldisulfide and N,N'-di-t-tetradecyldisulfied A solution of 153 parts of a commercial product consisting of a 4:1 mixture of t-dodecylamine and t-tetradecylamine in 350 parts of ether is stirred in a 1-liter flask and cooled to 5° C. A solution of 27 parts of sulfur monochloride in 140 parts of ether is added dropwise over a 2 hour period while maintaining the temperature at 5° to 8° C. The reaction mixture is allowed to warm to room temperature and then washed with aqueous potassium hydroxide and water until the water washings are neutral and free of chloride ion. The ether is distilled off at atmospheric pressure and the excess t-dodecylamine and t-tetradecylamine distilled off at a flask temperature of 110° C. and 1 mm. (Hg) pressure. The residual oil is 74 parts. It contains by analysis 65.61% C, 11.75% H, 6.44% N and 15.55% S and was found to have molecular weight of 418. The product is a mixture of N,N'-di-t-dodecyldisulfide ($C_{24}H_{52}N_2S_2$) and N,N'-di-t-tetradecyldisulfide ($C_{28}H_{58}N_2S_2$). Calculated for $C_{24.8}H_{53.6}N_2S_2$ is 67.1% C, 12.2% H, 6.3% N, 14.4% S and a molecular weight of 444.

Example 4

The procedure of Example 3 is repeated except that 239 parts of a mixture of 50% of t-octadecylamine and 50% of t-docosylamine is used in place of the t-dodecyl-t-tetradecylamine mixture and the excess amine is not distilled off. The product is a solution of mixed t-octadecyl-t-docosylaminodisulfides is a mixture of t-octadecyl and t-docosylamines.

The compounds of this invention have pesticidal properties and, in particular, are useful in fungicidal compositions. When so used, the compounds are usually taken up in a carrier or are formulated so as to render them suitable for subsequent dissemination as pesticides. For example, the bis(t-alkylamino)disulfides may be formulated as wettable powders, emulsion concentrates, dusts, granular formulations, aerosols or flowable emulsion concentrates. In such formulations, the compounds are extended with a gaseous, liquid or solid carrier and, when desired, suitable surfactants are incorporated.

Liquid compositions containing the compounds of this invention may be made by dissolving or dispersing the compounds in a suitable organic diluent, such as ketones, aliphatic and aromatic hydrocarbons, chlorinated hydrocarbons and pine oil. Suitable solvent-soluble emulsifying and/or dispersing agents may then be added. For example, 25 parts of a bis(t-alkylamino)disulfide are taken up in 71 parts of xylene and 4 parts of dioctylphenoxypolyethoxyethanol added.

Solid compositions are made by admixing the active ingredients with a finely divided solid commonly used in pesticidal formulations, such as clays, inorganic silicates and carbonates, and silicas and wetting agents, sticking agents and/or dispersing agents may be incorporated. A typical wettable powder may be made by blending 50 parts of a bis(t-alkylamino)disulfide, 40 parts of hydrated silico aluminate, 5 parts of octylphenoxypolyethoxyethanol and 5 parts of sodium lignin sulfonate.

The compounds were evaluated as fungicides in a standard slide spore germination test (cf. Phyopathology 33, 627 (1943)) utilizing spores of *Alternaria solani* (Alt.), *Monilinia fructicola* (Mon.) and *Stemphylium sarcinaeforme* (Stem.). The values obtained for the concentration in parts per million (p.p.m.), which effectively control 50% of the spores ($ED_{50}$), are given in Table I for typical compounds.

TABLE I.—FUNGICIDAL DATA

| Compound | $ED_{50}$ (p.p.m.) | | |
|---|---|---|---|
| | Alt. | Mon. | Stem. |
| t-$C_4H_9$NHSSNH$C_4H_9$-t | 10-50 | 10-50 | <1 |
| t-$C_8H_{17}$NHSSNH$C_8H_{17}$-t | 50-200 | 200-1,000 | 50-200 |
| t-$C_{13}H_{27}$NHSSNH$C_{13}H_{27}$-t | 200-1,000 | 200-1,000 | 200-1,000 |

The compounds of this invention are found to be effective for the control of corrosion in copper-lead bearings as shown by the following test.

Twenty-five parts of the preparation of Example 3 is blended with 70 parts of 4,4′-methylenebis-(2,6-di-t-butylphenol), 70 parts of tricresyl phosphate, 465 parts of the hydroxyethyl morpholinone diester of polybutenyl succinic acid, 450 parts of a commercial viscosity index improver comprising a copolymer of N-vinylpyrrolidinone and alkyl methacrylate made according to United States Patent No. 3,142,664 into 8920 parts of a 200 SUS solvent extracted neutral mineral oil. The viscosity of this blend is 13.05 cs. at 210° F., 96.98 cs. at 100° F. with a viscosity index of 128 and an ASTM pour point of −35° F. The lubricant is tested for corrosiveness in an engine by Method 3405 of Federal Test Method Standard No. 791a. At the end of 40 hours, the copper-lead bearing weight loss is 22.2 milligrams. The same lubricant without the product of Example 3 gives a copper-lead bearing weight loss of 66.9 milligrams.

This invention provides novel bis(t-alkylamino)disulfides which are useful as fungicides and corrosion inhibitors and which can be converted to useful di-t-alkylsulfurdiimines.

I claim:

1. An N,N′-bis(tertiary-alkylamino)disulfide of the formula

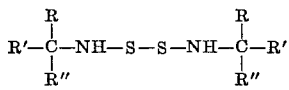

wherein R, R′ and R″ represent alkyl groups and wherein the total number of carbon atoms in any one

group is less than 25.

2. An N,N′-bis(tertiary-alkylamino)disulfide in accordance with the formula of claim 1 wherein R and R′ are methyl groups.

3. N,N′-di-t-butylaminodisulfide.
4. N,N′-di-t-octylaminodisulfide.
5. N,N′-di-t-nonylaminodisulfide.
6. N,N′-di-t-dodecylaminodisulfide.
7. N,N′-di-t-tetradecylaminodisulfide.

References Cited

UNITED STATES PATENTS 2,209,976   8/1940   James _____ 260—583

FOREIGN PATENTS 498,831   12/1953   Canada.

CHARLES B. PARKER, *Primary Examiner.*

R. L. RAYMOND, *Assistant Examiner.*